April 1, 1930.  C. S. BRAGG ET AL  1,753,168
FUELIZER FOR AIR WITHDRAWN FROM SUCTION ACTUATED POWER ACTUATORS
Filed May 28, 1925   2 Sheets-Sheet 1

April 1, 1930. C. S. BRAGG ET AL 1,753,168
FUELIZER FOR AIR WITHDRAWN FROM SUCTION ACTUATED POWER ACTUATORS
Filed May 28, 1925 2 Sheets-Sheet 2

Patented Apr. 1, 1930

1,753,168

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

FUELIZER FOR AIR WITHDRAWN FROM SUCTION-ACTUATED POWER ACTUATORS

Application filed May 28, 1925. Serial No. 33,375.

Our invention consists in the novel features hereinafter described, reference being had to the accompanying drawings, which illustrate several embodiments of the same selected by us for purposes of illustration, and the said invention is fully disclosed in the following description and claims.

In the operation of vacuum brakes for automotive vehicles or other vacuum or suction actuated devices in connection with internal combustion engines, it is extremely convenient to obtain the necessary suction, or partial vacuum, from a suction passage of the internal combustion engine, and located between the throttle valve for controlling the supply of mixture and the cylinder. To this end it is convenient and desirable to connect the vacuum brake mechanism with the intake manifold of the engine. It will be understood, further, that the air exhausted from the suction actuated mechanism and delivered into the intake manifold necessarily has a tendency to reduce the degree of rarification therein, and therefore to prevent the drawing in of the proper quantity of liquid fuel from the atomizer of the carburetor, or to dilute the explosive mixture passing through the suction passage frequently to such an extent that the resulting mixture reaching the engine cylinders will not readily ignite. In either case, the engine, if turning over idly, would be likely to stall, and the admission of air into the manifold in this manner may also materially delay the starting of the engine.

It is also to be understood that for the proper operation of a vacuum brake mechanism of a motor vehicle, it is desirable that the air shall be withdrawn from the brake actuating mechanism as rapidly as possible in order to insure quick operation of the brake mechanism, and that the use of any restrictions in the passage connecting the brake actuating mechanism with the intake manifold for the purpose of avoiding the stalling of the engine and delay in starting, would necessarily result in retarding the operation of the brake mechanism to a greater or lesser extent, and is therefore undesirable.

It is also to be understood that in the operation of vacuum brake mechanism and their suction actuated devices, the moving part, as the piston, is acted upon by differential pressures brought about by producing a condition of rarification on one side of the piston, and admitting a higher pressure fluid, usually atmospheric air, on the other side of the piston, under the control of a suitable reversing valve mechanism, and that the air so admitted is frequently withdrawn and delivered into the suction passage of the engine between the throttle and the cylinder ports, where the suction is provided by a connection between the actuator and the intake manifold.

In our former application for Letters Patent of the United States filed February 26, 1925, and given Serial No. 11,683, we have described a method of and apparatus for operating suction actuated devices in connection with the suction passage of an internal combustion engine, for the purpose of preventing the objectionable features above mentioned, without retarding the operation of the brake mechanism, by supplying motor fuel to the air exhausted from the suction actuated device before it reaches the intake manifold, so that when it does enter the manifold, it will be in the form of an explosive mixture, which will combine with the explosive charges delivered into the manifold from the carburetor of the engine, and will, therefore, not in any way tend to diminish the speed or interfere with the operation of the internal combustion engine.

According to our present invention, we provide a different form of apparatus from that described in our former application for accomplishing this desirable result in an extremely simple and efficacious manner, whereby a jet nozzle connected with a supply of liquid motor fuel, preferably without the intervention of a float chamber, is normally held closed by a spring, and provision is made for the free passage of a certain amount of air withdrawn from the vacuum actuated, or suction actuated device on its way to the manifold, such an amount, for example, as can be assimilated with the idling mixture without stalling the motor or interfering with its operation, without the admixture of liquid fuel thereto, but when a larger quantity of air passes through the apparatus, the liquid fuel control valve will open and admit liquid fuel to enrich the larger quantity of air, so that it will mix with the explosive charges passing through the manifold and prevent interference with the proper and desired operation of the engine. Our invention also includes means for adjusting the apparatus so as to vary the quantity of air which may pass through freely without operating the liquid fuel control valve, and also for the simple and effective adjustment of the apparatus to effect desired variations in the richness or leanness of the mixture admitted to the manifold.

In the accompanying drawings.

Figure 1:
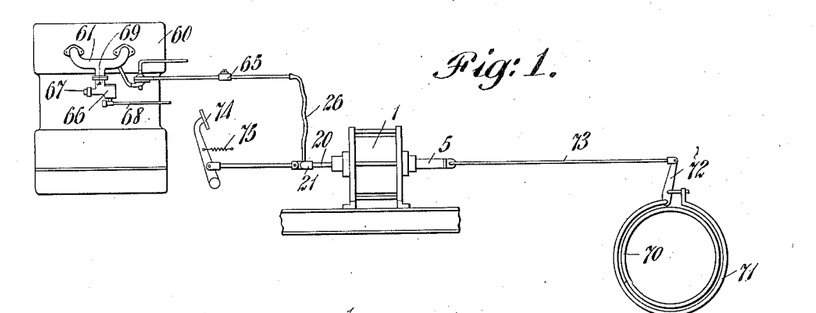
Fig. 1 is a diagrammatic view showing an installation in an automotive vehicle comprising an internal combustion engine, brake mechanism for the vehicle, and a vacuum operated power actuator for the brake mechanism, and having our present invention embodied therein.
Figures 5, 6, 7:
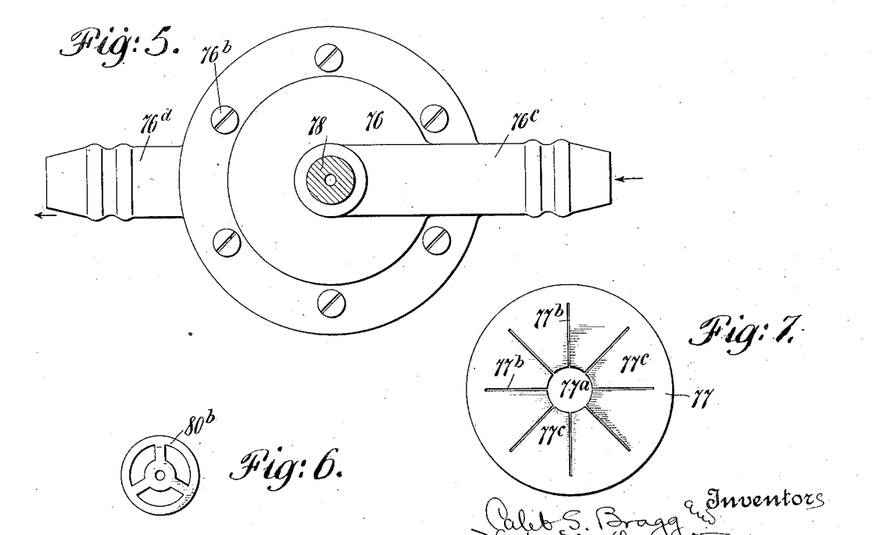
Fig. 5 is a top plan view of the device illustrated in Fig. 3.
Fig. 6 is a detail plan view of the spider shown in Fig. 5.
Fig. 7 is a detail plan view of one form of disc which may be employed in the construction.

In Fig. 1, we have illustrated our invention applied in connection with an automotive vehicle propelled by an internal combustion engine, and having a vacuum or suction actuated device for operating the brake mechanism of the vehicle. In this figure, 1 represents the cylinder of a power actuator of the kind illustrated in our former application for Letters Patent of the United States filed January 5, 1925, and given Serial No. 506. The cylinder is provided with a double acting piston, 3, hollow piston rod, 5, connected by a link, 73, to brake lever, 72, for operating a brake mechanism of any usual or preferred construction, diagrammatically illustrated in Fig. 1, and comprising in this instance a brake band, 71, and brake drum, 70, so that the movement of the piston in one direction applies the brake, and in the opposite direction, releases the brake. The hub of the actuator piston is provided with reversing valve mechanism operated by a longitudinally movable valve actuating rod, or sleeve, 20, extending therethrough, and through the hollow piston rod, and projecting through the opposite end of the cylinder through a suitable stuffing box, said valve mechanism being so constructed as to place one end of the cylinder in communication with a suction line or pipe to the intake manifold, and the other end of the cylinder in communication with the atmosphere, and vice versa, according as the valve actuating sleeve is moved in one direction or the other. The particular valve mechanism forms no part of our present invention, and will not be described in detail. The valve actuating sleeve is provided approximately centrally of its length with an internal plug, or partition, 23, the rear portion, to the right in Fig. 2, being connected with the atmosphere through an aperture, 5ª, in the hollow piston rod, and the opposite end of the valve actuating sleeve, 20, being connected to a suction pipe, 26, extending to the manifold, 61, of the internal combustion engine, 60, said suction pipe, 26, being provided with a check valve, 65. In this instance we have shown the valve sleeve, 20, provided with two pairs of oppositely arranged valves, 40, 41 and 42, 43, loosely mounted on the valve sleeve and having interposed between the valves of each pair a retracting and sealing member, 50, tending to seat the valves of each pair, said valves being opened by means of collars, 51, secured to the sleeve, 20, on opposite sides of the respective pairs of valves. The head of the piston is also shown provided with ports 34 and 35, on opposite sides of the piston communicating with a suction chamber, 3ª, and the piston is also provided with ports, 33 and 35, on opposite sides of the piston communicating with an air inlet chamber, 3ᵇ. The specific valve mechanism herein shown and described is covered by our former applications for Letters Patent of the United States, to wit, Serial No. 506, filed January 5, 1925, and Serial No. 13,183, filed March 5, 1925, and this valve mechanism, per se, will not be specifically claimed herein. In the form of the actuator herein shown, the air is normally exhausted from the actuator cylinder, 1, on both sides of the piston when the latter is in normal or off position, so that the actuator cylinder itself serves also the purpose of a vacuum storage space and obviates the necessity of providing an extraneous suction or vacuum tank. In this instance this is accomplished by providing the valve actuating sleeve, 20, with a stop, as for example, the shoulder, 21, in Fig. 2, which will arrest the sleeve in such position that when the piston is in its retracted position the central valves, indicated at 41 and 42, will be held in open position, thereby placing the cylinder on both sides of the piston in communication with the vacuum or suction pipe, 26, but the same result may be accomplished in other ways. The valve sleeve, 20, is operatively connected with a foot lever or other operator operated device, indicated at 74, provided with a retracting spring, 75. 66 represents the main carburetor of the internal combustion engine, having the main intake, 67, and gasoline supply pipe, 68. 69 represents the usual throttle valve interposed between the carburetor and the intake manifold. In the pipe or passage, 26, leading from the actuator to the intake manifold, we insert a separate carbureting device, for carbureting or enriching the air withdrawn from the actuator by suction and delivered into the intake manifold whenever it is withdrawn in such quantities as would otherwise interfere with the operation of the engine while idling. A preferred form of this carbureting device is illustrated in Figs. 3, 4 and 5, for example. In these figures the device comprises a hollow body, preferably formed in two parts or halves, indicated at 76 and 76$^a$, which are preferably united by screws or bolts, 76$^b$, arranged in a circle and spaced equally distant from each other. The upper section, 76, is provided with an inlet pipe or passage, 76$^c$, and the lower section is provided with an outlet pipe or passage, 76$^d$, so that the device can be connected in the suction line, 26, in any suitable manner. The hollow body or casing of the device is provided with a flexible disc of sheet metal, or other suitable material, indicated at 77, which is conveniently clamped at its edges between the two halves or sections of the device, and this disc, which is shown in detail in Fig. 7, is provided with a central aperture, 77$^a$, and with a plurality of radial slits, 77$^b$, which extend from the central aperture to points near the periphery of the disc to form a plurality of yielding fingers, 77$^c$. The upper section, 76, of the main body is provided with a screw plug, 78, having a threaded portion which is screwed into a threaded recess in the connection, 76, and an exterior threaded portion adapted to be connected with a pipe, 79, for supplying gasoline or other liquid motor fuel to the device. The plug, 78, has a vertical bore terminating in a needle valve seat, 78$^a$, engaged by a vertically disposed needle valve, 80, extending through the central aperture of the disc, 77, and engaging a guiding recess, 76$^e$, in the lower part of the body section, 76$^a$, the upper end of the needle valve being guided in an aperture, 76$^f$, in the upper section, 76, of the body. This needle valve is provided with yielding means for holding it normally in closed position, in this instance a coil spring, 80$^a$, engaging a circular spider, 80$^b$, which may be adjustably secured to the needle valve by providing it with a centrally threaded hollow engaging a threaded portion of the needle valve, and a lock nut, 80$^c$, is provided for securing it in adjusted position, which is normally slightly below the fingers, 77$^c$, of the flexible disc, 77. Above the flexible disc, 77, the needle valve is provided with a vertically movable sleeve, 81, loosely surrounding the needle valve and engaging a bearing recess in the upper portion of the body section, 76, said sleeve carrying at its lower end a circular plate, 82, which is held a short distance above the flexible disc, 77. We provide means for adjusting the sleeve, 81, plate, 82, vertically with respect to the flexible disc, 77, which in this instance includes a conical boss 81$^a$ on the sleeve, 81, adapted to be engaged by the conical ends of horizontal adjusting screws, 83, inserted on opposite sides of the body section, 76, (see Fig. 4) to limit the downward movement of the sleeve, 81, which is pressed downwardly by the coil spring, 84. The adjusting screws, 83, are provided with set nuts, 83$^a$, as shown, or other means for locking them in adjusted position.

It will be understood that the spring which holds the needle valve seated will be strong enough to keep the needle valve seated against the customary two pounds pressure in the main fuel line from which it receives its gasoline or other liquid fuel supply, indicated at 79, plus the additional ten pounds pressure, which is approximately the greatest rarification which can exist in the manifold, so that the valve will remain seated normally, unless positively opened by the operation of the flexible disc.

The carbureting device shown in Figs. 3, 4 and 5, is inserted in the suction line, 26, so that the air withdrawn from the actuator passes into the device through the connection, 76$^c$, and leaves by way of the connection, 76$^d$, on its way to the manifold. The spring, 80$^a$, holds the needle valve normally closed. The slots, 77$^b$, in the disc, 77, not only serves to make the disc more flexible in its central portion than would be the case if it were not slotted, but also permits a certain amount of air to pass through it freely without moving the fingers, 77$^c$, in the direction of the circular spider, 80$^b$. The plate, 82, may be so adjusted as to engage the disc, 77, on the opposite side, and close the central opening in the disc, or said plate may be so adjusted at a slight distance from the disc, as to permit a certain amount of air to pass through the central opening, 77ª, in the disc, 77, without depressing the spring fingers, 77ᶜ. In any event, the air which can pass through the apparatus without deflecting the spring fingers, is approximately the amount that can be assimilated with the idling mixture passing from the carburetor to the engine cylinders, without stalling the motor while idling. The extent of separation of the circular plate, 82, from the disc, 77, in conjunction with the slots, 77ᵇ, constitute in effect a by-pass for the air through the carbureting device without actuating the needle valve, and this by-pass can be adjusted by varying the positions of the circular plate toward and from the disc. When sufficient air is passing through the carbureting device beyond the capacity of this by-pass the diaphragm fingers will be forced downward, further opening the slots, and the ends of the fingers will engage the circular spider, 80ᵇ, and depress the needle valve 80 from its seat, 78ª, admitting liquid motor fuel which combines with the air passing through the carbureting device to form an explosive mixture, said mixture therefor entering the intake manifold as an explosive mixture, and combining with the normal explosive charges passing from the carbureting device to the cylinders. By adjusting the circular plate, 82, toward and from the disc, the capacity of the so called by-pass may be usually adjusted from the exterior of the apparatus and this may be used to effect a simple adjustment for enriching or leaning the mixture passing therethrough without the necessity of separating the parts of the apparatus and adjusting the clearance between the spider, 80ᵇ, and the fingers.

Figures 2, 8, 9:
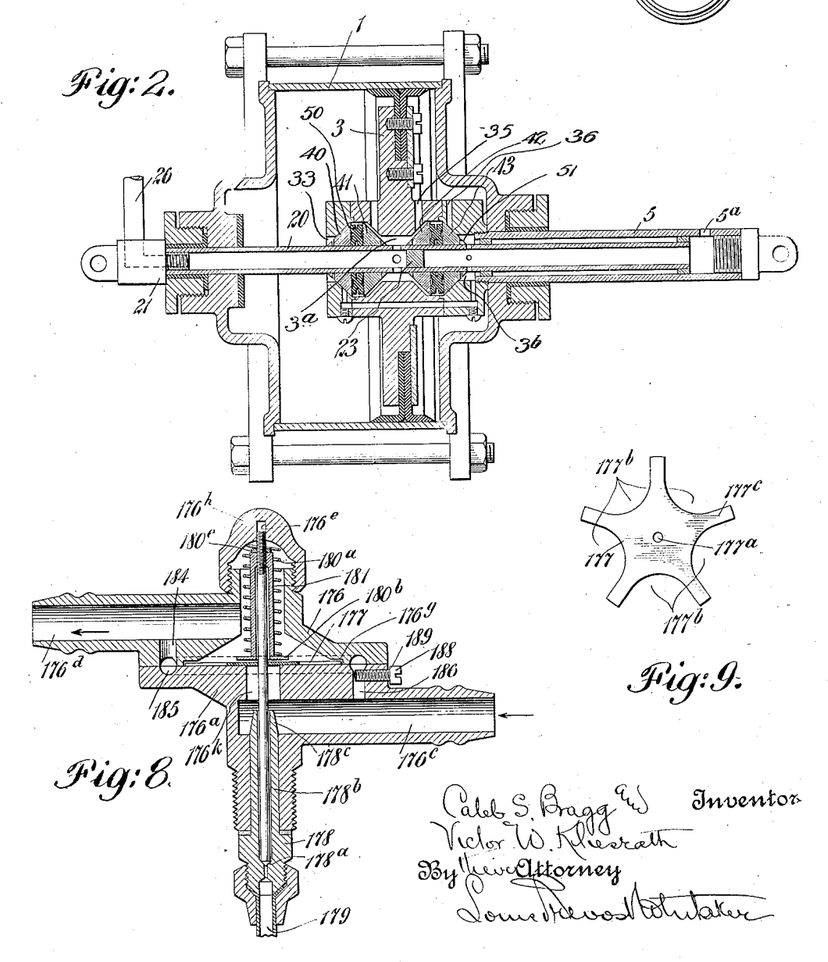
Fig. 2 is an enlarged sectional view of one form of power actuator which may be conveniently employed in an installation of this kind.
Fig. 8 is a sectional view of a slightly modified form of auxiliary carburetor.
Fig. 9 represents a different form of disc, in which the fingers extend toward the outer edge instead of toward the inner edge, as shown in Fig. 7.
Figures 3, 4:
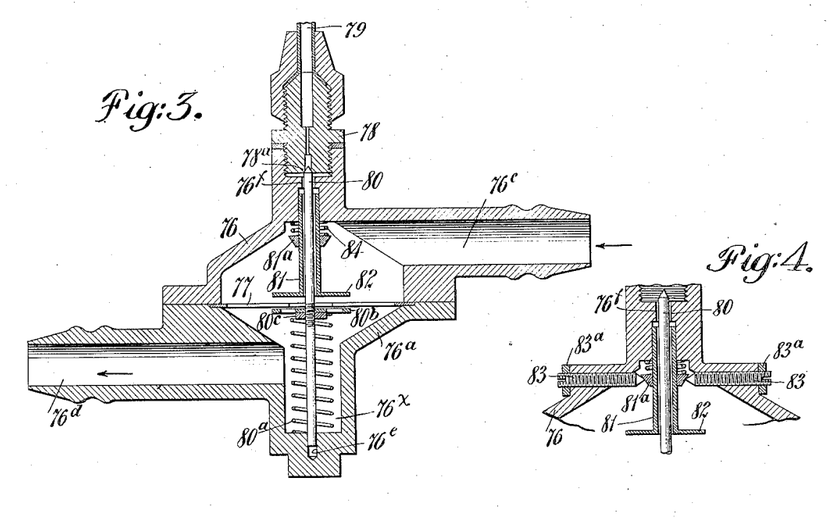
Fig. 3 is an enlarged view of the auxiliary carburetor for supplying liquid motor fuel to the air passing through the suction pipe from the actuator to the intake manifold of the engine when passing in sufficiently large quantities to make this necessary in order to prevent interference with the operation of the engine.
Fig. 4 is a partial sectional view of the device taken in a plane, perpendicular to the plane of section of Fig 3.

In Figs. 8 and 9 we have illustrated a modification of our invention, in which the same parts are given the numerals heretofore employed with the addition of 100. In this instance the flexible disc, 177, shown in detail in Fig. 9, is cut away at its periphery, as indicated at 177ᵇ, so as to form radially and outwardly extending fingers, 177ᶜ, which are held loosely in an annular recess, 176ᵍ, in the section, 176, of the main body or casing, adjacent to its engagement with the lower section, 176, the arrangement in this modification being inverted with respect to the form shown in the preceding figures. The disc, 177, is also provided with a central aperture, 177ª, through which extends the needle valve, 180, engaging the valve seat, 178ª, in the plug or fitting, 178, which has a guiding portion, 178ᵇ, extending up into the body section, 176, and provided with a discharge nozzle, 178ᶜ, adjacent to the inner end of the inlet pipe or passage, 176ᶜ into which the air is admitted from the actuator. Above the disc, 177, the main body is provided with a removable cap, 176ʰ, provided at its upper portion with a guiding recess, 176ᵉ, for the upper end of the needle valve. Around the needle valve is a sleeve 181, carrying at its lower end, a spider, 180ᵇ. The sleeve, 181, has a screw threaded portion at its upper end engaging a threaded portion of the needle valve, so that the position of the spider can be adjusted toward and from the disc, 177, and a set nut, 180ᵉ, is provided for locking the sleeve in adjusted position. A coil spring, 180ª, is provided between the cap, 176ʰ, and the spider, 180ᵇ, which normally holds the needle valve seated. In this instance we have shown the disc, 177, provided with a central aperture of approximately the size of the needle valve, and in order to provide a by-pass through the main body or casing for a small quantity of air, insufficient to effect the idling mixture in the intake manifold, we have in this instance shown the two halves, or sections, 176 and 176ª, of the body or casing, provided with annular channels forming an annular passage, 185, connected by passage, 186, with the inlet passage, 176ᶜ, and by passage, 184, with the outlet passage, 176ᵈ, so that a certain amount of air may pass through the main body by way of the passages, 186, 184, and the annular passage, 185, without affecting the flexible disc, 177. We also prefer to provide means for adjusting the capacity of this by-pass, and in this instance we have shown an adjustable screw, 188, and set nut, 189, therefor, the set screw being so arranged that it may throttle more or less the communicating aperture, 186, leading to the annular channel, 185, and thus regulate the amount of air which can pass through the carbureting device without actuating the needle valve, and without receiving liquid fuel. This adjusting screw also provides a simple and effective adjustment for regulating the degree of enrichment of the mixture delivered by the auxiliary carburetor when larger quantities of air are passing through. Obviously the less air which passes through the by-pass under those conditions, the richer the resulting mixture will be, and vice versa. Immediately below the center of the flexible disc, and above the discharge nozzle, 178ᶜ, the lower body section, 176ª, is provided with an aperture, 176ᵏ. When a larger amount of air is drawn through the carbureting device, in the operation of the brake mechanism than can be accommodated by the adjustable by-pass, the central portion of the flexible disc, 177, will be raised, engaging the spider 180ᵇ, and opening the needle valve and admitting liquid motor fuel to enrich the air which passes upward through the central aperture, 176ᵏ, escaping around the cutaway portions, 177ᵇ, of the disc, and passing out through the outlet pipe, 176ᵈ, where it mixes with the air coming through the by-pass. It will also be noted that by removing the cap, 176ʰ, access is immediately had to the adjustable sleeve, 181, of the spider, and the set nut, 180ᶜ therefor, for adjusting the same toward or from the central portion of the flexible disc, 177.

It will also be understood that in place of the disc, 177, made in the form shown in Fig. 7, we may employ the form of disc illustrated in Fig. 8, in which radial slots are formed, and the flexible fingers project inwardly toward the center. In such case the effect of considerable quantities of air passing through the parts would be to cause the flexible fingers to lift and engage the spider, 180ᵇ, and open the needle valve.

As before stated, the form of carbureting device illustrated in Figs. 3 to 7, inclusive, is our preferred form. It will also be noted, especially by reference to Fig. 3, that the lower suction pipe, 76ᵃ, of the device, is provided with a vertically disposed recess, indicated at 76ˣ, containing the spring, 80ᵃ, for the needle valve, and that the bottom of this recess is below the outlet pipe, 76ᵈ, so that any excess of liquid fuel which may be admitted to the hollow body at any time, will collect in this well or recess, 76ˣ, where it will be gradually taken up by the air passing through the apparatus.

It will be noted that when the power actuator is not operating, is the period when maximum rarification will exist in the connecting suction pipe, and the air passage through the auxiliary carburetor, but at such time no air is passing. When the greatest quantity of air is passing, the rarification is minimum. Our invention maintains the valve closed at the time of maximum rarification to prevent flooding either the carburetor or the actuator, and the valve remains closed as the degree of rarification falls and a small amount of air passes through it, less than sufficient to materially affect the running of the engine, while the valve is opened to carburet the air when the amount of air sucked out of the actuator is sufficient to otherwise slow down the engine or stall it if idling. The operation of the auxiliary carburetor is in nowise responsive to the operation of the engine, but on the contrary is responsive only to the operation of the power actuator, and acts not to vary the quantity or quality of the mixture to meet a changed condition in the running of the engine, but on the contrary to avoid any interference with the existing mixture supplied to the engine by its own entirely separate and independent carburetor.

What we claim and desire to secure by Letters Patent is:—

1. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, and a diaphragm member constructed to pass quantities of air ineffectual to affect the operation of the engine if unfueled, said diaphragm flexed only by abnormal quantities of air traversing said air passage to directly open said fuel valve.

2. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, means normally acting to hold said valve in closed position, a diaphragm member extending across said air passage and closing the major area thereof, said diaphragm constructed to be flexed only by abnormal quantities of air traversing said air passage, and means actuated by said diaphragm member for directly opening the fuel valve when said diaphragm is so flexed.

3. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, a spring for normally holding said fuel valve closed, a diaphragm member bridged across and closing a major portion of said air passage and adapted to be flexed only by the passage of abnormal quantities of air through said air passage from the actuator, and an abutment carried by the fuel valve and engaged by said diaphragm member when so flexed to open said valve.

4. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, a spring for normally holding said valve closed, and a diaphragm bridged across said air passage and constructed normally to permit the passage of small quantities of air and to flex to pass abnormal quantities of air, and means actuated when the diaphragm is so flexed to open the fuel valve.

5. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, a spring for normally holding said valve closed, a diaphragm bridged across said air passage and constructed normally to permit the passage of small quantities of air and to flex to pass abnormal quantities of air, and adjustable means engaged by the diaphragm member when so flexed to open the fuel valve.

6. Means for carbureting air withdrawn from a suction operated power actuator to the suction passage of an internal combustion engine acting as a source of suction, comprising a hollow body having an air passage therethrough, a fuel supply inlet to said hollow body, a valve for controlling said inlet, and a slotted diaphragm member bridged across said passage to permit the passage of relatively small amounts of air through said hollow body and adapted to be flexed upon abnormal quantities of air passing through said body from the actuator, said diaphragm member acting to open the fuel valve when so flexed.

7. A fuelizing device for insertion between a suction actuated device and the suction passage of an internal combustion engine, comprising an air connection between said suction actuated device and the suction passage of the engine, a hollow body having an air passage therethrough forming a part of said connection, an inlet for motor fuel, a valve for said inlet, a spring normally holding the valve in closed position against the maximum rarification in said passage when insufficient air is passing therethrough to materially affect the operation of the engine, a device provided with yielding portions extending across said air passage and adapted to be flexed by the passage of air therethrough when the suction actuated device is operated, and a part connected with the valve and adapted to be engaged by said yielding portions to open the needle valve upon a predetermined degree of flexure and admit motor fuel for carbureting the air passing through the air passages in quantities sufficient to materially effect the operation of the engine if not fuelized.

8. A fuelizing device for insertion between a suction actuated device and the suction passage of an internal combustion engine, comprising an air connection extending from the suction actuated device to said suction passage of the engine and connected to the latter at a point between the throttle valve and the engine cylinder, a hollow body interposed in said connection having an air passage therethrough forming a part of said air connection, an inlet in said body for motor fuel, a needle valve for said inlet, a spring normally holding the needle valve in closed position against maximum suction in the air passage when insufficient air is passing therethrough to materially affect the operation of the engine, a device provided with yielding portions extending across the air passage and adapted to be flexed by the passage of air therethrough when the suction actuated device is operated, and a part connected with said valve and adapted to be engaged by said yielding portions to open the valve and admit motor fuel for carbureting the air passing through said fuelizing device, said fuelizing device being provided with means for permitting small quantities of air insufficient to affect the operation of the engine to pass through said main body without operating the needle valve.

9. A fuelizing device for insertion between a suction actuated device and the suction passage of an internal combustion engine, comprising an air connection from the suction actuated device to the suction passage of the engine, a hollow body in said air connection having an air passage therethrough forming a part of said connection, an inlet for liquid motor fuel, a needle valve for said fuel inlet, a spring normally holding said needle valve in closed position against the maximum suction in the air passage when insufficient air is passing therethrough to materially affect the operation of the engine, a device provided with yielding portions extending across said air passage and adapted to be flexed by the passage of air therethrough when the suction actuated device is operated, and a part connected with said needle valve and adapted to be engaged by said yielding portions to open the needle valve and admit motor fuel for carbureting the air passing through said device, said fuelizing device being provided with means for permitting small quantities of air to pass through said body without operating the needle valve, and adjustable means for varying the quantity of air which can pass through said body without operating the needle valve.

10. A fuelizing device for insertion between a suction actuated device and the suction passage of an internal combustion engine comprising an air connection between said suction actuated device and the suction passage of the engine, a hollow body having an air passage therethrough forming a part of said connection, an inlet for motor fuel, a needle valve for said fuel inlet, a spring normally holding the needle valve in closed position, a spider adjustably secured to the needle valve, a flexible disc interposed in the passage through said hollow body and having portions in position to engage the spider when the disc is flexed by the passage of air through the main body in sufficient quantities to injuriously affect the operation of the engine if not fuelized, to open said needle valve, said disc being provided with cut away portions to facilitate the passage of abnormal quantities of air when in flexed position.

11. A fuelizing device for insertion between a suction actuated device and the suction passage of an internal combustion engine, comprising an air connection from the suction actuated device to said suction passage of the engine, including a hollow body, an inlet therein for motor fuel, a needle valve for said inlet, a spring normally holding said needle valve in closed position against maximum suction in the air passage when insufficient air is passing therethrough to materially affect the operation of the engine, said body being formed in two sections, a laterally projecting part connected with the needle valve, a flexible disc having peripheral portions held in position between opposed faces of said sections and adapted to engage said laterally projecting part when said disc is flexed by the passage of air through the main body in sufficient quantities to injuriously affect the operation of the engine if not fuelized, to open the needle valve, said disc being provided with cut-away portions to facilitate the passage of abnormal quantities of air through the main body when in flexed position.

12. A fuelizing device for insertion between a suction actuated device and the suction passage of an internal combustion engine, comprising an air connection between said suction actuated device and the suction passage of the engine, a hollow body having an air passage therethrough forming a part of said connection, an inlet for motor fuel, a needle valve for said fuel inlet, a spring normally holding the needle valve in closed position, a disc extending across the passage through the main body and having peripheral portions engaging the main body to support the same, said disc being provided with radially disposed slits forming flexible fingers extending from the peripheral portions toward the center, and a part connected to the needle valve and lying in the path of said fingers when flexed, whereby the passage of air in considerable quantities through said main body will flex said fingers and open the needle valve.

13. A fuelizing device for insertion between a suction actuated device and the suction passage of an internal combustion engine, comprising an air connection between said suction actuated device and the suction passage of the engine, a hollow body having an air passage therethrough forming a part of said connection, an inlet for motor fuel, a needle valve for said fuel inlet, a spring normally holding the needle valve in closed position, a disc extending across the passage through said main body having peripheral portions engaging the main body and supporting the disc, said disc being provided with a central aperture and with radial slots extending from said peripheral portions to said central aperture and forming flexible fingers, said slots providing at all times a free passage for small quantities of air through the main body without flexing said fingers, and a part secured to the needle valve in the path of said fingers adapted to be engaged by said fingers when flexed by the passage of larger quantities of air through the main body, to open the needle valve and effect the carburation of the air.

14. A fuelizing device for insertion between a suction actuated device and the suction passage of an internal combustion engine, comprising an air connection between said suction actuated device and the suction passage of the engine, a hollow body having an air passage therethrough forming a part of said connection, an inlet for motor fuel, a needle valve for said fuel inlet, a spring normally holding the needle valve in closed position, a disc extending across the passage through said main body having peripheral portions engaging the main body and supporting the disc, said disc being provided with a central aperture and with radial slots extending from said peripheral portions to said central aperture and forming flexible fingers, said slots providing at all times a free passage for small quantities of air through the main body without flexing said fingers, and a part secured to the needle valve in the path of said fingers adapted to be engaged by said fingers when flexed by the passage of larger quantities of air through the main body, to open the needle valve and effect the carburation of the air, and means for adjusting said finger engaging part with respect to the needle valve.

15. A fuelizing device for insertion between a suction actuated device and the suction passage of an internal combustion engine, comprising an air connection between said suction actuated device and the suction passage of the engine, a hollow body provided with an air inlet and an air outlet communicating with said air connections, a partition within said hollow body having an air passage connecting said air inlet and air outlet, said hollow body being provided with an inlet for liquid motor fuel, a needle valve for controlling said fuel inlet, a flexible disc extending across the central aperture of said main body, and provided with a central aperture in substantial registration therewith, and provided with radial slots extending from the peripheral portions thereof toward the center to form flexible fingers, a spring normally holding the needle valve closed, against the maximum suction in the air passage, when insufficient air is passing therethrough to materially affect the operation of the engine, a circular part adjustably secured to the needle valve and located in position to be engaged by said fingers when flexed by the passage of sufficient quantities of air to injuriously affect the operation of the engine, if not fuelized, to open the needle valve.

16. A fuelizing device for insertion between a suction actuated device and the suction passage of an internal combustion engine, comprising an air connection between said suction actuated device and the suction passage of the engine, a hollow body provided with an air inlet and an air outlet communicating with said air connections, a partition within the hollow body having an air passage connecting said air inlet and air outlet, said hollow body being provided with an inlet for liquid motor fuel, a needle valve for controlling said fuel inlet, a flexible disc extending across the central aperture of said main body, and provided with a central aperture in substantial registration therewith, and provided with radial slots extending from the peripheral portions thereof toward the center to form flexible fingers, a spring normally holding the needle valve closed, against the maximum suction in the air passage, when insufficient air is passing therethrough to materially affect the operation of the engine, a circular part adjustably secured to the needle valve and located in position to be engaged by said fingers when flexed by the passage of sufficient quantities of air to injuriously affect the operation of the engine, if not fuelized, to open the needle valve, and a plate located on the opposite side of said disc from the finger engaging part and held at a slight distance therefrom to regulate the amount of air which can pass through the central aperture of said disc without flexing said fingers.

17. A fuelizing device for insertion between a suction actuated device and the suction passage of an internal combustion engine, comprising an air connection between said suction actuated device and the suction passage of the engine, a hollow body provided with an air inlet and an air outlet communicating with said air connections, a partition within the hollow body having an air passage connecting said air inlet and air outlet, said hollow body being provided with an inlet for liquid motor fuel, a needle valve for controlling said fuel inlet, a flexible disc extending across the central aperture of said main body, and provided with a central aperture, in substantial registration therewith, and provided with radial slots extending from the peripheral portions thereof toward the center to form flexible fingers, a spring normally holding the needle valve closed, against the maximum suction in the air passage, when insufficient air is passing therethrough to materially affect the operation of the engine, a circular part adjustably secured to the needle valve and located in position to be engaged by said fingers when flexed by the passage of sufficient quantities of air to injuriously affect the operation of the engine, if not fuelized, to open the needle valve, a circular plate located on the opposite side of said disc from the finger engaging part, and means for adjusting said plate toward and from said disc.

18. A fuelizing device for insertion between a suction actuated device and the suction passage of an internal combustion engine, comprising an air connection between said suction actuated device and the suction passage of the engine, a hollow body having an air passage therethrough connected with said air connection, a flexible disc extending across said air passage and provided with a central aperture and with radial cutaway portions forming flexible fingers adapted to be flexed by the passage of air through said air passage in sufficiently large quantities to materially affect the operation of the engine, if not fuelized, said hollow body being provided with an inlet for liquid motor fuel, a needle valve for said inlet, a spring normally holding the needle valve seated against the maximum suction in the air passage, when insufficient air is passing therethrough to materially affect the operation of the engine, and a spider secured to the needle valve and having portions adjacent to said flexible fingers, said needle valve extending through the said disc, a sleeve adjustably secured to the needle valve on the opposite side of said disc from the spider, and an annular plate secured to said sleeve and held thereby adjacent to the central portion of said disc for regulating the amount of air which may pass through the hollow body without operating the needle valve.

19. Means for carbureting air withdrawn from a suction operated power actuator to the suction passage of an internal combustion engine acting as a source of suction, comprising a hollow body having an air passage therethrough, a fuel supply inlet to said body, a valve for controlling said inlet, a diaphragm flexed only when the actuator is operated by abnormal quantities of air therefrom traversing said air passage to open said valve, and a passage through said diaphragm for air in insufficient quantities to injuriously affect the operation of the engine.

20. Means for carbureting air withdrawn from a suction operated power actuator to the suction passage of an internal combustion engine acting as a source of suction and independent of the engine carburetor, comprising a hollow body having an air passage therethrough, a fuel supply inlet to said hollow body, a valve for controlling said inlet, and a diaphragm member which is flexed only by abnormal quantities of air traversing said air passage to directly open said fuel valve.

21. Means for carbureting air withdrawn from a suction operated power actuator to the suction passage of an internal combustion engine acting as a source of suction and independent of the engine carburetor, comprising a hollow body having an air passage therethrough, a fuel supply inlet to said body, a valve for controlling said inlet, a diaphragm flexed only when the actuator is operated by abnormal quantities of air therefrom traversing said air passage to open said valve, and a passage through said body for air in insufficient quantities to injuriously affect the operation of the engine.

In testimony whereof we affix our signatures.

CALEB S. BRAGG.
VICTOR W. KLIESRATH.